US012300226B2

(12) United States Patent
Saeki

(10) Patent No.: US 12,300,226 B2
(45) Date of Patent: May 13, 2025

(54) UTTERANCE ANALYSIS DEVICE, UTTERANCE ANALYSIS METHOD, AND COMPUTER PROGRAM

(71) Applicant: Panasonic Intellectual Property Management Co., Ltd., Osaka (JP)

(72) Inventor: Natsuki Saeki, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 276 days.

(21) Appl. No.: 17/559,033

(22) Filed: Dec. 22, 2021

(65) Prior Publication Data

US 2022/0114348 A1    Apr. 14, 2022

Related U.S. Application Data

(63) Continuation of application No. PCT/JP2020/021809, filed on Jun. 2, 2020.

(30) Foreign Application Priority Data

Jul. 4, 2019 (JP) .................................. 2019-125454
Jul. 22, 2019 (JP) .................................. 2019-134559

(51) Int. Cl.
*G10L 15/22*     (2006.01)
*G06F 16/353*    (2025.01)
(Continued)

(52) U.S. Cl.
CPC ............ *G10L 15/22* (2013.01); *G06F 16/353* (2019.01); *G06F 40/295* (2020.01); *G06F 40/35* (2020.01);
(Continued)

(58) Field of Classification Search
CPC ......... G10L 15/22; G10L 15/18; G10L 15/26; G10L 15/10; G06F 16/353; G06F 40/295;
(Continued)

(56) References Cited

U.S. PATENT DOCUMENTS 11,334,715 B2 *   5/2022   Miyabe ................... G06F 16/00
2017/0161370 A1 * 6/2017   Endo ....................... G06F 16/338
(Continued)

FOREIGN PATENT DOCUMENTS

JP    2011-123706    6/2011
JP    5468474        4/2014
(Continued)

OTHER PUBLICATIONS

International Search Report issued Sep. 8, 2020 in International Application No. PCT/JP2020/021809 with English translation.
(Continued)

*Primary Examiner* — Hai Phan
*Assistant Examiner* — Ian Scott McLean
(74) *Attorney, Agent, or Firm* — Wenderoth, Lind & Ponack, L.L.P.

(57) ABSTRACT

An utterance analysis device including; a calculator that receives utterance data in order of time series and analyzes a change in the utterances by using a plurality of first likelihoods, which are each values for identifying a possibility that the utterance data corresponds to each category; and a display processor that displays visualization data visualizing the change in the utterances which is obtained by the calculator. The calculator determines a second likelihood for each category by integrating the first likelihoods of a plurality of pieces of utterance data in a second period which is shorter than the first period. The visualization data displayed by the display processor represents a change in the
(Continued)

utterances based on a change in the second likelihood of each category in a plurality of different second periods.

16 Claims, 15 Drawing Sheets

(51) Int. Cl.
*G06F 40/295* (2020.01)
*G06F 40/35* (2020.01)
*G06F 40/44* (2020.01)
*G10L 15/18* (2013.01)
*G10L 15/26* (2006.01)

(52) U.S. Cl.
CPC .............. *G06F 40/44* (2020.01); *G10L 15/18* (2013.01); *G10L 15/26* (2013.01)

(58) Field of Classification Search
CPC ...... G06F 40/35; G06F 40/44; G06F 16/3344; G06F 16/35; G06F 16/3329; G06F 16/3343
See application file for complete search history.

(56) References Cited

U.S. PATENT DOCUMENTS

2017/0329872 A1* 11/2017 Dispensa ............ G06F 16/2471
2019/0294624 A1 9/2019 Miyabe et al.

FOREIGN PATENT DOCUMENTS

| JP | 2017-016566 | 1/2017 |
| JP | 2018-120640 | 8/2018 |
| WO | 2018/110029 | 6/2018 |

OTHER PUBLICATIONS

English translation of International Preliminary Report on Patentability issued Jan. 6, 2022 in International (PCT) Application No. PCT/JP2020/021809.

* cited by examiner

FIG.1
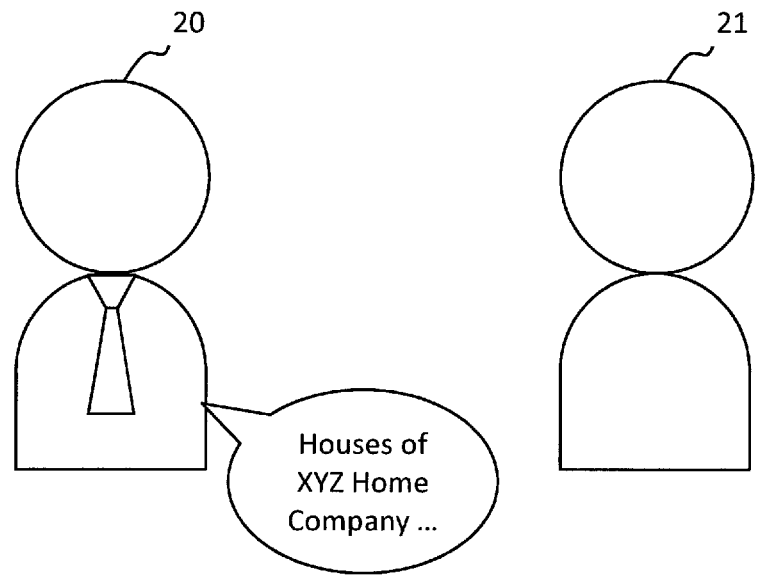
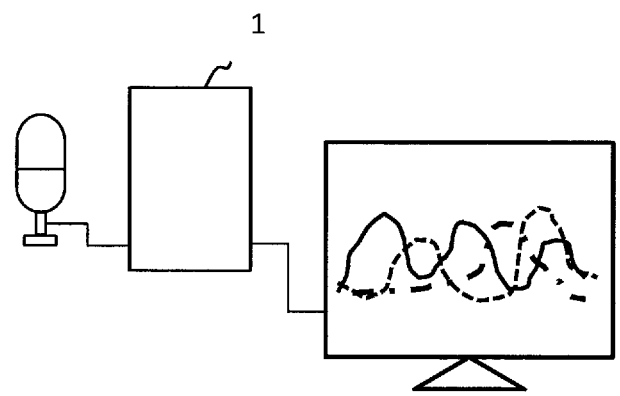
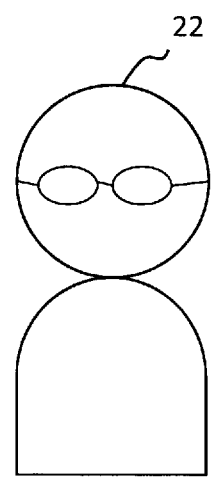

FIG.3

| NO. | TEXT DATA | CATEGORY LIKELIHOOD ||||
| --- | --- | --- | --- | --- | --- |
| | | XYZ HOME | ROOM LAYOUT | FINANCE | OTHER |
| 1 | ... | 1.000 | 0.000 | 0.000 | 0.001 |
| 2 | ARE YOU LOOKING FOR LAND? | 0.001 | 0.000 | 0.000 | 0.064 |
| 3 | WHICH AREA DO YOU WANT? | 0.002 | 0.002 | 0.003 | 0.056 |
| 4 | WHERE DO YOU WORK? | 0.006 | 0.002 | 0.005 | 0.053 |
| | ... | | | | |

UTTERANCE ANALYSIS DEVICE, UTTERANCE ANALYSIS METHOD, AND COMPUTER PROGRAM

CROSS-REFERENCE TO RELATED APPLICATIONS

This is a continuation application of International Application No. PCT/JP2020/021809, with an international filing date of Jun. 2, 2020, which claims priority of Japanese Patent Application No. 2019-125454 filed on Jul. 4, 2019, and Japanese Patent Application No. 2019-134559 filed on Jul. 22, 2019, each of the content of which is incorporated herein by reference in its entirety.

TECHNICAL FIELD

The present disclosure relates to an utterance analysis device, an utterance analysis method, and a non-transitory computer-readable recording medium storing a computer program, for visualizing a change in a topic in utterances of an utterer.

BACKGROUND ART

With advances in voice recognition technology, it has become possible to acquire voice data of an utterer and process voice-recognized content.

Japanese Patent No. 5468474 discloses a system configured to convert the content of speaking referring to a talk script by an operator at a call center, for example, into text by voice recognition processing, and to output information on a usage frequency of the talk script. With the technology described in Japanese Patent No. 5468474, for example, a problem in that the quality of a response record varies depending on the skill of the operator can be solved, and a response record ensuring uniformity and conciseness can be automatically created.

SUMMARY

The present disclosure provides an utterance analysis device, an utterance analysis method, and a computer program which are capable of visualizing a course of a topic in utterances of an utterer.

A device of the present disclosure is an utterance analysis device for visualizing a change in utterances of an utterer in a first period, the utterance analysis device including: a calculator that receives a plurality of pieces of utterance data in order of time series and analyzes a change in the utterances by using a plurality of first likelihoods, which are each values for identifying a possibility that the utterance data corresponds to each category; and a display processor that displays visualization data visualizing the change in the utterances which is obtained by the calculator. In the utterance analysis device, the calculator determines a second likelihood for each category by integrating the first likelihoods of a plurality of pieces of utterance data in a second period which is shorter than the first period, and the visualization data displayed by the display processor represents a change in the utterances based on a change in the second likelihood of each category in a plurality of different second periods.

Those general and specific modes may be implemented by a system, a method, and a computer program stored, for example, on a non-transitory computer-readable recording medium, and combinations thereof.

According to the utterance analysis device, the utterance analysis method, and the computer program of the present disclosure, the course of the topic in the utterances of the utterer can be visualized.

BRIEF DESCRIPTION OF DRAWINGS

FIG. 1 is a schematic diagram illustrating an outline of an utterance analysis device according to an embodiment of the present disclosure.

FIG. 3 is a data structure table showing utterance data used by the utterance analysis device of FIG. 2.

DETAILED DESCRIPTION

Figure 2:
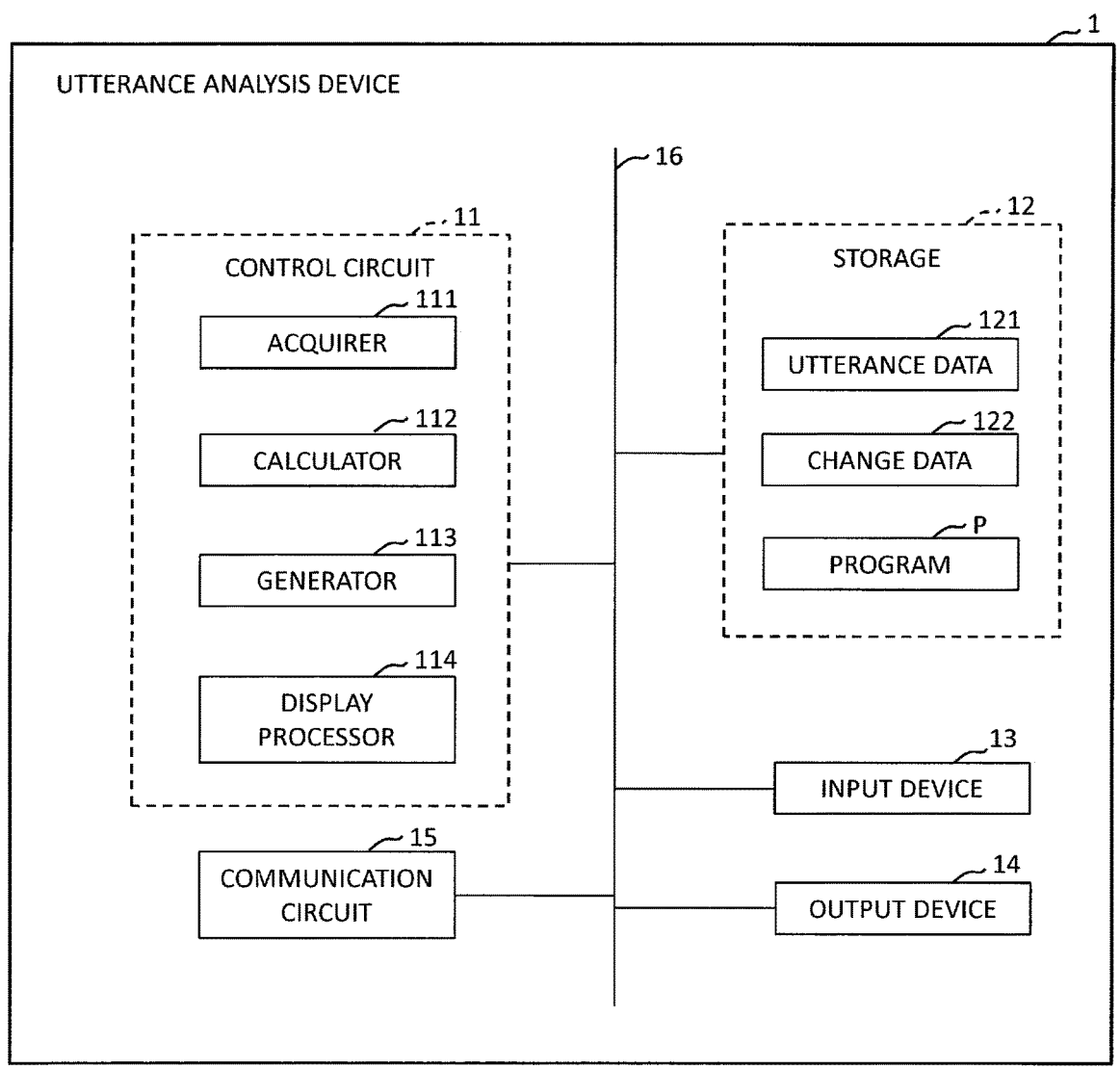
FIG. 2 is a block diagram illustrating a configuration of the utterance analysis device of the present disclosure.

Knowledge Forming the Basis of the Present Disclosure

In the related art, when utterances of an utterer are analyzed, sentence units are set as a processing target, and analysis is performed by using words included in each sentence. Meanwhile, when utterances consisting of a plurality of sentences in a certain period are analyzed, there are cases in which it may be preferred to analyze a plurality of sentences as a target.

An utterance analysis device according to the present disclosure is configured to visualize a change in a course of a topic in utterances of an utterer over a certain period. Specifically, the utterance analysis device identifies and visualizes how the topic in utterances over a certain period changes. For example, when an utterer makes utterances, the topic generally changes over time. The utterance analysis device of the present disclosure can acquire the utterances of the utterer, identify the topic of the utterances, and visualize the change in the topic.

EMBODIMENTS

[1-1. Configuration]

An embodiment of the present disclosure is now described with reference to the drawings as required. However, in the detailed description, of the description relating to the related art and configurations which are substantially the same, for the sake of simplicity, parts which are not required may be omitted. In addition, the following description and the accompanying drawings are disclosed so that those skilled in the art can fully understand the present disclosure, and are not intended to limit the subject matter of the claims.

The utterance analysis device according to the present disclosure visualizes the change in the course of the topic regarding the utterances of the utterer in a certain period. For example, as illustrated in FIG. 1, an utterance analysis device 1 includes a microphone as an input device. The utterance analysis device 1 acquires utterance data emitted by an utterer 20 to a customer 21, visualizes the change in the course of the topic, and displays visualized information on a display, for example, as an output device. As a result, for example, even a user 22 who is not present at the time of the utterances of the utterer 20, can evaluate the utterances of the utterer 20 by looking at the visualized information. In the following description, the utterer 20 is assumed to be an employee of a housing manufacturer which sells built-to-order houses (in the following description, the housing manufacturer is referred to as "XYZ Home Company" or "XYZ Home" as required). Further, the utterances of the utterer 20 include, for example, an explanation about the company's built-to-order houses and a required explanation about the sale and purchase of the built-to-order houses to the customer 21. The example shown in FIG. 1 is an example, and specifically, as described later, the utterance analysis device 1 is not required to be installed in all situations in which the utterer 20 and the customer 21 are having a conversation. Further, the user 22 may also be able to externally access the utterance analysis device 1 via a network.

As used herein, "utterance" means an action of speaking by the utterer 20 and a voice generated by speaking, and "utterance data" is voice data generated by the utterer 20 speaking. "Utterance data" may be text data obtained by converting the voice data generated by the utterer 20 who is speaking into text by voice recognition. Further, the "utterance data" may be data including such "voice data" and "text data."

As used herein, "a topic" refers to content of utterance of the utterer 20. Further, a "topic category" or "category" means a classification for identifying a topic of the utterer 20. Specific examples are described later, but of a plurality of topic categories set in advance, the utterance analysis device 1 identifies which of those categories the topic of the utterance of the utterer 20 corresponds to.

As used herein, "likelihood" is a numerical value representing a likelihood to be used in a likelihood function. The likelihood is used as a numerical value representing the likelihood of the target utterance corresponding to each topic category.

In the following description, as illustrated in FIG. 1, the person making the utterance is referred to as the "utterer 20," and the person conversing with the utterer 20 is referred to as the "customer 21." Further, the person using the data in which the course of the topic regarding the utterances of the utterer 20 is visualized by the utterance analysis device 1 is referred to as the "user 22." The user 22 may be the utterer 20 or may be a person other than the utterer 20. For example, the utterer 20 itself can be the user 22 in order to confirm his or her own past utterances. In addition, a superior of the utterer 20 can be the user 22 in order to evaluate the work of the utterer 20. Moreover, a colleague or a subordinate of the utterer 20 can be the user 22 in order to refer to the utterance method of the utterer 20.

As illustrated in FIG. 2, the utterance analysis device 1 is an information processing device including, for example, a control circuit 11, a storage 12, an input device 13, an output device 14, and a communication circuit 15. Those units are connected by a bus 16.

The control device 11 is a controller for controlling the whole utterance analysis device 1. For example, the control device 11 implements processing as an acquirer 111, a calculator 112, a generator 113, and a display processor 114 by reading and executing a program P stored in the storage 12. Further, the control device 11 is not limited to a control device for implementing a predetermined function through cooperation of hardware and software, and may be a hardware circuit specially designed to implement a predetermined function. That is, the control device 11 can be implemented by one or more various processors, for example, a central processing unit (CPU), a microprocessing unit (MPU), a graphics processing unit (GPU), a field programmable gate array (FPGA), a digital signal processor (DSP), and an application specific integrated circuit (ASIC).

The storage 12 includes a storage medium for storing various types of information. The storage 12 is implemented, for example, by a random-access memory (RAM), a read-only memory (ROM), a flash memory, a solid-state drive (SSD), a hard disk drive, another storage device, or an appropriate combination thereof. In addition to the program P to be executed by the control device 11, the storage 12 stores, for example, information to be used as identification information, and various information acquired in order to assign the identification information. For example, the storage 12 stores utterance data 121, change data 122, and the program P.

The input unit 13 is input means, for example, an operation button, a keyboard, a mouse, a touch panel, or a microphone, which is used to perform operations and input data. The output device 14 is output means, for example, a display or a speaker, which is used to output processing results and data. The utterance analysis device 1 acquires utterance data by using a microphone, which is the input device 13, generates visualization data from the acquired utterance data by using the control device 11, and outputs the obtained visualization data to a display, for example, which is the output device 14.

The communication unit 15 is an interface circuit (module) for enabling data communication to and from an external device (not shown).

Here, the utterance analysis device 1 may be implemented by one computer, or may be implemented by a combination of a plurality of computers connected via a network. Further, for example, all or a part of the data stored in the storage 12 may be stored in an external storage medium connected via a network 40, and the utterance analysis device 1 may be use the data stored in the external storage medium. Specifically, the utterance data 121 and the change data 122 may be stored in an external storage medium.

The acquirer 111 acquires, for example, when the utterer 20 makes an utterance, the utterance data of the utterer by using the microphone, which is the input device 13. Further, the acquirer 111 assigns a number to the acquired utterance data of the utterer 20 in order of acquisition in time series, and stores the numbered utterance data 121 in the storage 12.

The utterance analysis device 1 is a device for visualizing the utterances of the utterer 20, and therefore only the utterance data of at least the utterer 20 is required to be acquired. In the present disclosure, acquisition and visualization of the utterance data of the customer 21 are not described.

The calculator 112 determines a likelihood, which is a value for identifying the possibility that the topic of each piece of utterance data 121 corresponds to a predetermined category. Further, the calculator 112 stores the likelihood of each category in association with the utterance data 121. As used herein, the "likelihood" for each category is referred to as a "category likelihood" as required.

The utterance data 121 can include, together with the voice data or in place of the voice data, text data obtained by converting the voice data of each piece of utterance data 121 into text by voice recognition processing. In this case, the voice recognition processing may be executed in the utterance analysis device 1 or by an external device.

Like the example shown in FIG. 3, the utterance data 121 is data for associating a "number," which is identification information assigned to each piece of utterance data 121 in time-series order, the "text data" generated from voice data during this period, and the "category likelihood" of each category obtained for the utterance data of the period.

In the example shown in FIG. 3, the utterance data 121 includes category likelihoods obtained for each of an "XYZ Home" category, a "room layout" category, a "finance" category, and an "other" category. The "room layout" category is a category in which the topic relates to the room layout of a house. The "XYZ Home" category is a category in which the topic relates to XYZ Home. The "finance" category is a category in which the topic relate to funding. The "other" category is a category for cases in which the topic is not included in any of the categories of "XYZ Home," "room layout," and "finance."

Here, for ease of understanding, there is described an example using four categories, that is, "XYZ Home," "room layout," "finance," and "other," but the number of categories to be processed by the utterance analysis device 1 is not limited. Further, the categories described here are merely examples. The present disclosure is not limited to those examples, and categories may be freely set in accordance with the topic of the utterance.

Figure 4:
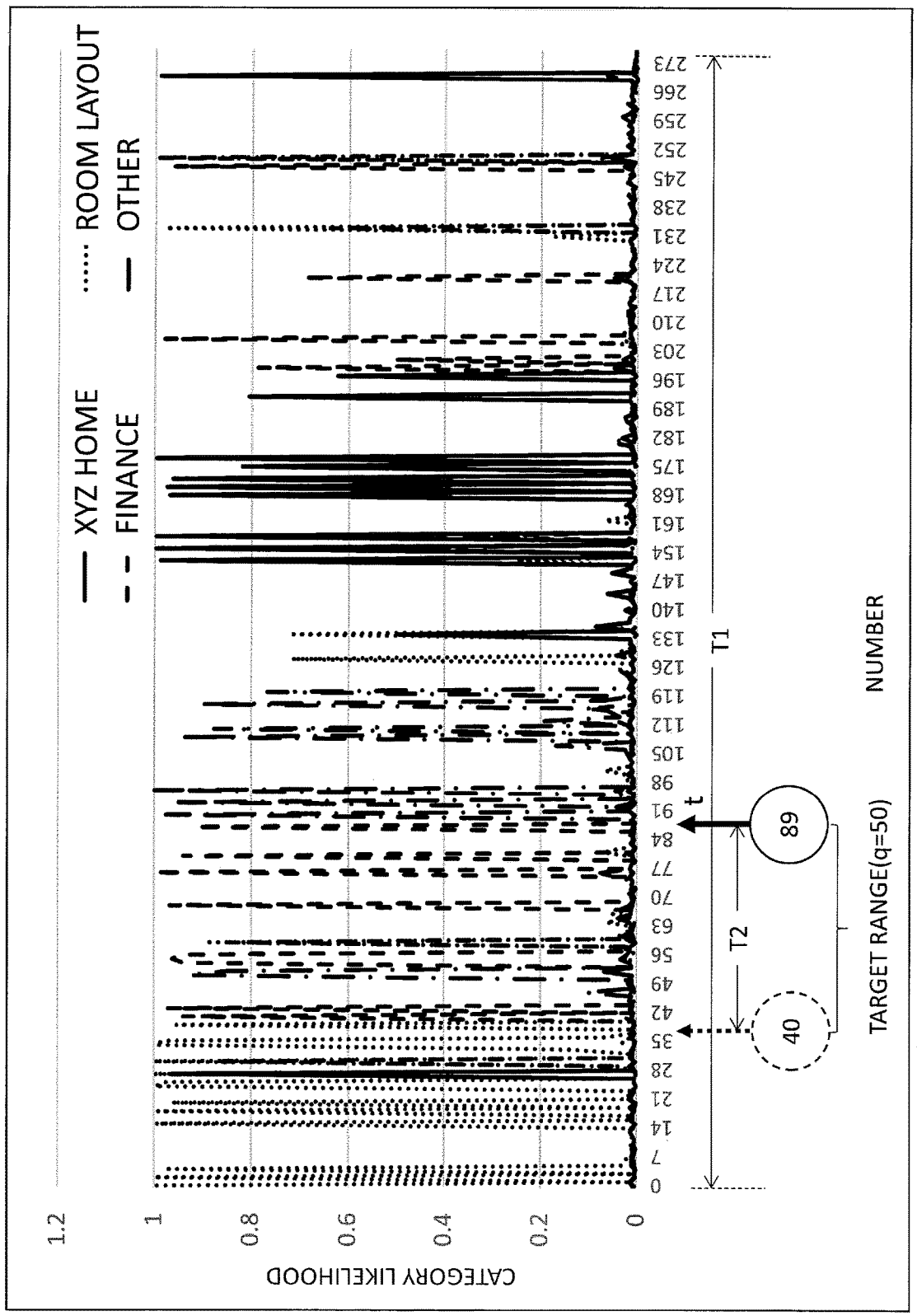
FIG. 4 is a graph showing a category likelihood used by the utterance analysis device of FIG. 2.

FIG. 4 is an example of a graph for showing the category likelihoods determined in the calculator 112 for a plurality of topic categories set in advance in relation to a plurality of pieces of utterance data 121. The calculator 112 can determine each likelihood by using a class classification model learned in advance. Specifically, the classes of the class classification correspond to the topic categories described above. In FIG. 4, the horizontal axis represents the "number" assigned to the utterance data 121, and shows the time series of the utterance data 121. The vertical axis represents the "category likelihood" obtained by the calculator 112.

The change in the transition of the category for each piece of utterance data 121 shown in FIG. 4 is complex, and it is difficult to identify the topic flow as a whole. Therefore, the calculator 112 can identify the category in a wider range than each piece of utterance data 121 to enable changes in the topic to be grasped more easily.

The calculator 112 identifies the topic category by using the determined category likelihoods. When identifying the category of a topic of a predetermined time "t", the calculator 112 uses the likelihoods of a plurality of pieces of utterance data 121 of a second period T2, which is immediately before the predetermined time "t" and is shorter than a first period T1 in which changes in the utterances of the utterer 20 are to be visualized in the utterance analysis device 1, to determine a second likelihood for identifying the possibility of the utterance of the second period T2 corresponding to a predetermined category, stores the determined second likelihood as change data 122 in the storage 12, and identifies the topic category of the second period T2. In the following, as required, the "first period" is referred to as "utterance period," the "second period" is referred to as "time window," and the "second likelihood" is referred to as "integrated likelihood." The "time window" can be set as the number of the utterance data 121 or as an elapsed time.

In FIG. 4, the utterance period T1 is a period corresponding to a total of 277 pieces of the utterance data 121, and the time window T2 is an example of a period corresponding to 50 pieces of the utterance data 121. For example, in order to identify the topic category at the time of number "89", the category likelihoods of the utterance data 121 in the period from numbers "40" to "89" corresponding to the time window T2 are used.

Specifically, the calculator 112 sets the time window T2 as the target range for each category, and determines the integrated likelihood for each category obtained for each piece of utterance data 121 included in this target range. Further, the calculator 112 can identify the category having the largest value among the integrated likelihoods obtained for each category as the topic category at the time having a certain utterance number.

Figure 5A:
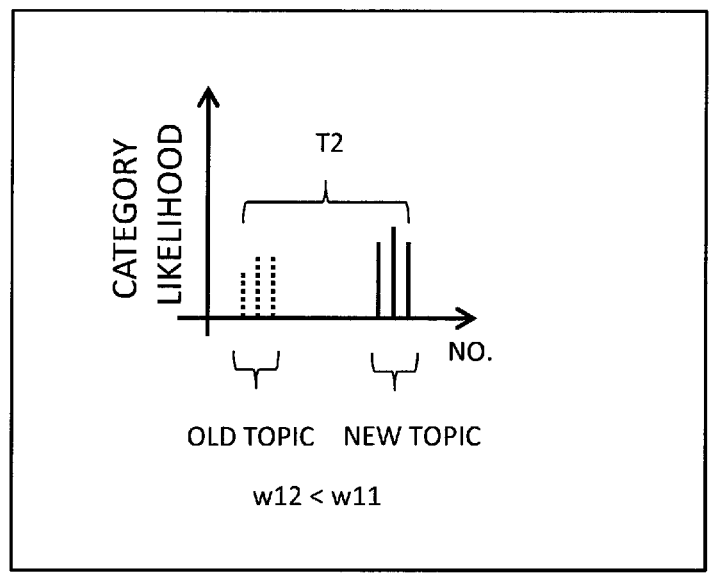
FIG. 5A is a graph showing a freshness weighting value used by the utterance analysis device of FIG. 2 to calculate an integrated likelihood.

In addition, the calculator 112 can determine the integrated likelihood by using a "freshness weighting value w1" set in accordance with a freshness of the topic. Specifically, as shown in FIG. 5A, the freshness weighting value w1 is a value which increases the weighting of a category likelihood of new utterance data 121 ("w11" of FIG. 5A) with respect to the predetermined time "t" more than the weighting of a category likelihood of old utterance data 121 ("w12" of FIG. 5A). For example, in the target range of a certain period, newer utterances have a higher possibility of being the topic category of the period, or there is a higher possibility that the topic is continuing, and older utterances have a lower possibility of being the topic category of the period. Therefore, in the calculator 112, the accuracy of identifying the topic can be improved by using the freshness weighting value w1 to identify the topic of the target period. Specifically, when the 50 pieces of utterance data 121 from number 40 to number 89 are set as the time window T2, the category likelihood identified from the 80th piece of utterance data to the 89th piece of utterance data is set to have a higher weighting than the category likelihood identified from the 40th piece of utterance data to the 49th piece of utterance data 121. Further, when "5 minutes" is set as the time window T2, the category likelihood identified from the utterance data 121 from 1 minute before the predetermined time "t" to the predetermined time "t" is set to have a higher weighting than the category likelihood identified from the utterance data 121 from 5 minutes before the predetermined time "t" to 4 minutes before the predetermined time.

Figure 5B:
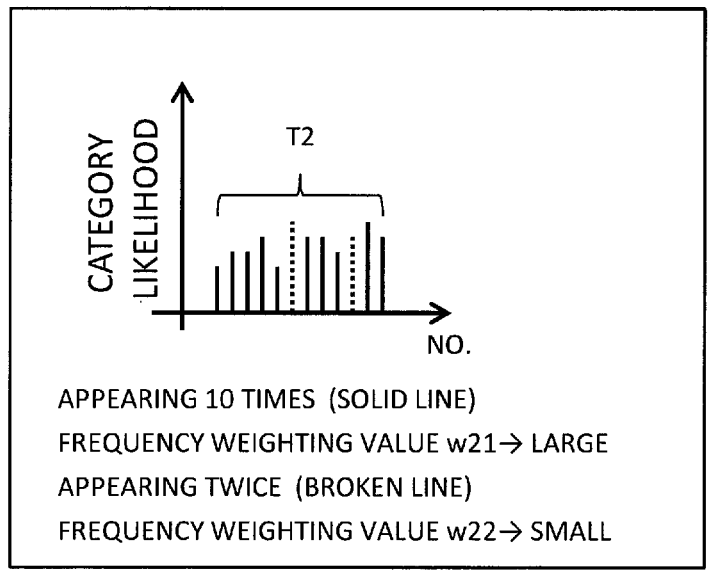
FIG. 5B is a graph showing a frequency weighting value used by the utterance analysis device of FIG. 2 to calculate the integrated likelihood.

Further, the calculator 112 can determine the integrated likelihood by using a "frequency weighting value w2" set in accordance with a topic frequency. Specifically, as shown in FIG. 5B, the frequency weighting value w2 is a value that, for the appearance frequency of the category having the highest category likelihood of the utterance data 121 included in the target range, increases the weighting of the category likelihood of category having a high appearance frequency ("w21" of FIG. 5B) more than the weighting of the likelihood of the category having a low appearance frequency ("w22" of FIG. 5B). For example, in the range of the time window T2, a category appearing many times has a higher possibility of being the topic category for that period, while a category that does not appear often has a lower possibility of being the topic category for that period. Therefore, in the calculator 112, the accuracy of identifying the topic can be improved by using the frequency weight value w2 to identify the topic of the target period. Specifically, when the time window T2 includes 50 pieces of the utterance data 121, the likelihood of a topic appearing 20 times is set to have a higher weighting and a larger category likelihood than the likelihood of a topic appearing only twice. The calculator 112 calculates the appearance frequency ("w21" and "w22" of FIG. 5B) of each category in the range of time window T2 in the manner described above.

For example, the calculator 112 can determine an integrated likelihood Lc2 for each category based on the following expression (1).

$$Lc2(i) = E(Lc(j) \times w1) \times w2 \quad (1)$$

Each value used in expression (1) is defined as follows.
c: Number identifying the category
i: Number identifying the target range
Lc2($i$): Integrated likelihood of an i-th target range
j: Number assigned to each piece of utterance data 121 in the target range
Lc(j): Category likelihood of a j-th piece of utterance data 121 in the target range
w1: Freshness weighting value
w2: Frequency weighting value
Expression (1) is the sum of j=1 to j=q.

Figure 6:
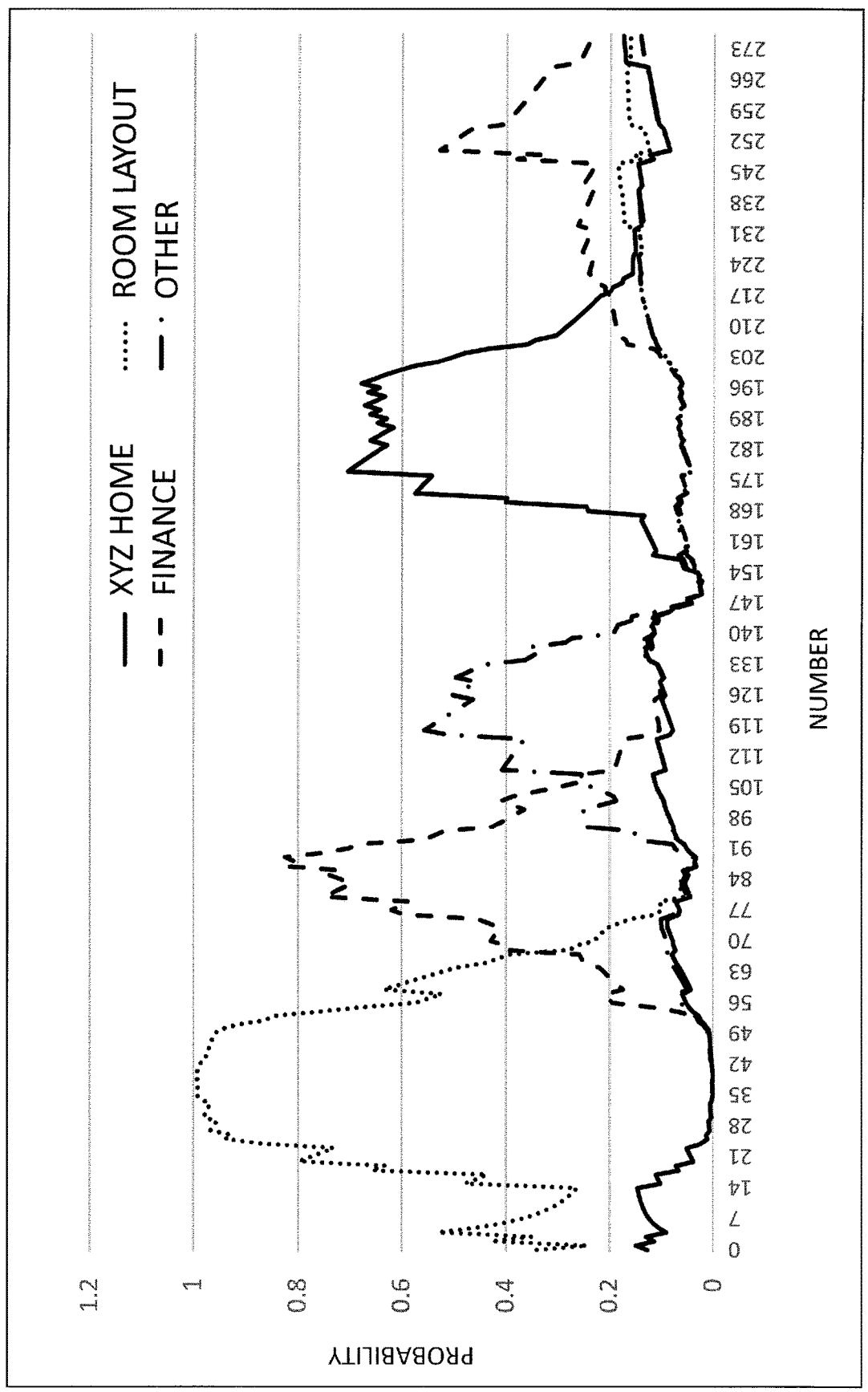
FIG. 6 is a graph showing a probability of being a topic obtained by the utterance analysis device of FIG. 2.

The calculator 112 can normalize the obtained integrated likelihood Lc2 of each category. The calculator 112 can also add the normalized data to the change data 122 in the storage 12. As a result, each category of a certain utterance number can be expressed as a probability of being the topic, as shown in FIG. 6. For normalization, the calculator 112 can use, for example, a method of determining the probability by softmax. As shown in FIG. 6, a graph for showing changes in the topic can be obtained by plotting the probability values of each category at each utterance number by using the probability Pc(i) thus obtained. As a result, a transition state of the topic can be visualized as a smooth change, similarly to the changes in topic in an actual conversation.

Figure 7:
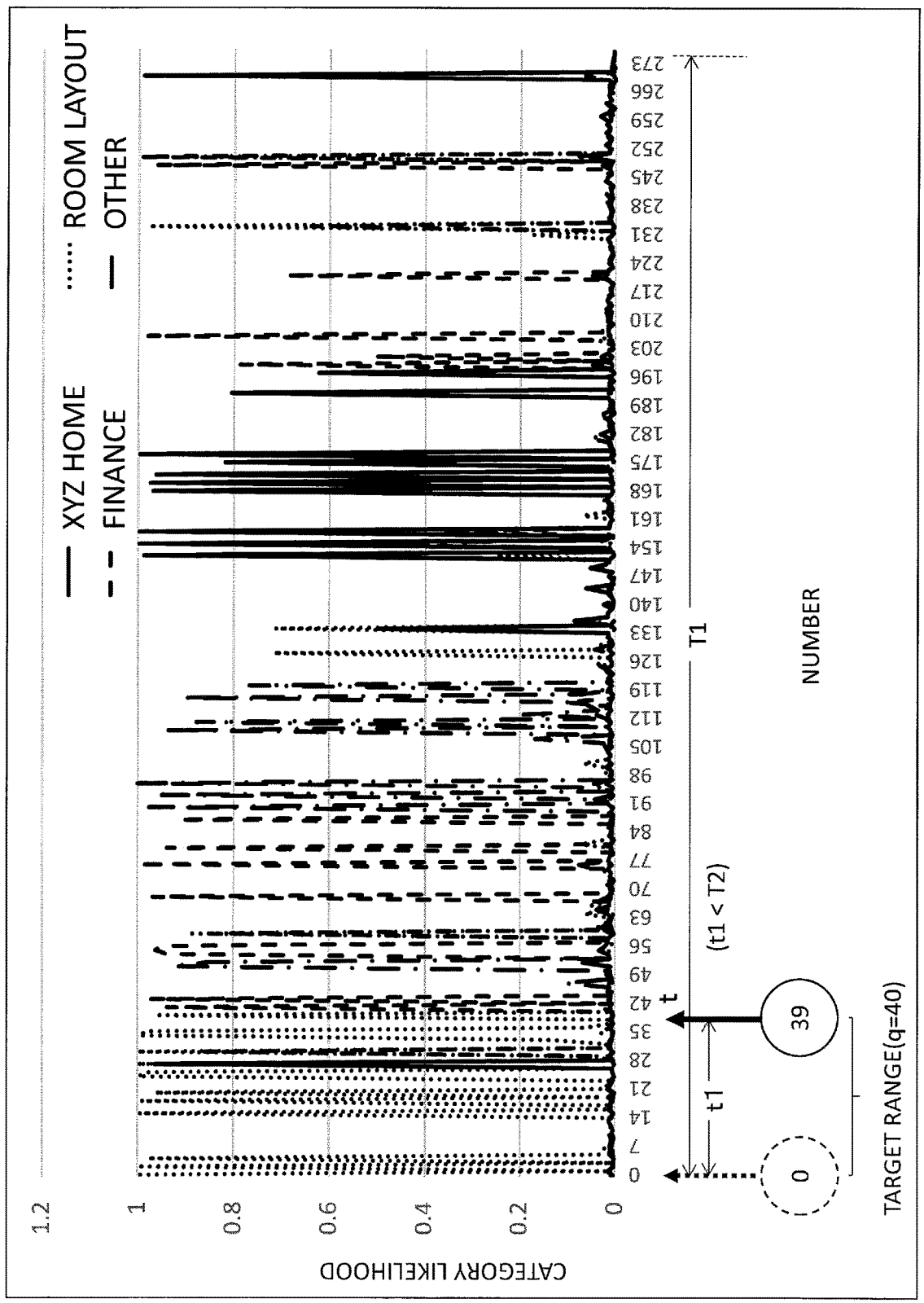
FIG. 7 is a graph showing a target range used when the integrated likelihood is determined by the utterance analysis device of FIG. 2.

The calculator 112 sets, when a period t1 from the start of the utterance period T1 to the predetermined time "t" is less than the time window T2 (when t1<T2), a range including the utterance data 121 from the start of the utterance period T1 to the predetermined time "t" as a target range, and calculates the integrated likelihood in the same manner as the category likelihood of the utterance data 121 of the target range. With reference to the example shown in FIG. 7, there is now described an example for a case in which a period corresponding to "50" pieces of the utterance data 121 is set as the time window T2, and the time point at the number "39" is set as the predetermined time. In this case, the period t1 from the start of the utterance period T1 to the predetermined time "t" is a period shorter than the time window T2 and corresponds to "40" pieces of the utterance data 121. In such a case, for example, the integrated likelihood is determined by using the likelihood from the start of the utterance period T1 to the predetermined time "t". When the period t1 is less than the time window T2 (when t1<T2), weighting may be performed such that the integrated value of the likelihoods becomes smaller.

Figure 8:
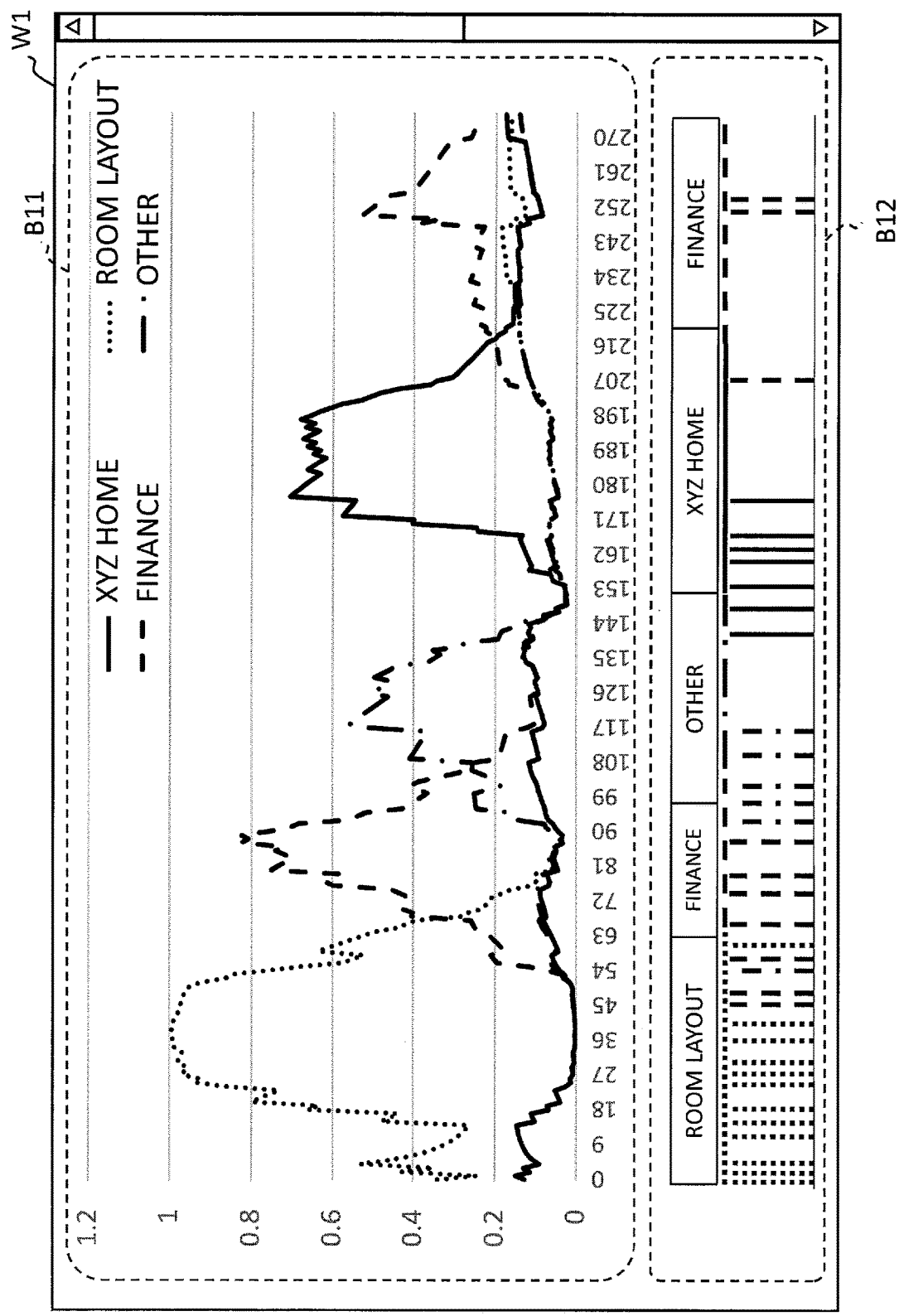
FIG. 8 is an example of a screen displayed as visualization data by the utterance analysis device of FIG. 2.

The generator 113 uses the identification result obtained by the calculator 112 to generate visualization data visualizing the change in the topic relating to the utterance data 121. The generator 113 can generate visualization data visualizing the change in the topic of a plurality of time windows T2. Further, the generator 113 may generate visualization data including a graph in which the integrated likelihood of each classification is displayed in time series. Specifically, visualization data for displaying a display screen W1 like that illustrated in FIG. 8 is generated. An example of the display screen W1 illustrated in FIG. 8 includes a display section B11 displaying a graph for showing the change in the integrated likelihood, and a display section B12 displaying a time-series change obtained from the graph displayed in the display section B11. The display screen W1 illustrated in FIG. 8 enables the user 22 to see at a glance that the utterances of the utterer 20 have changed in order from "room layout" to "finance," "other," "XYZ Home," and "finance."

[1-2. Operation]

Figure 9:
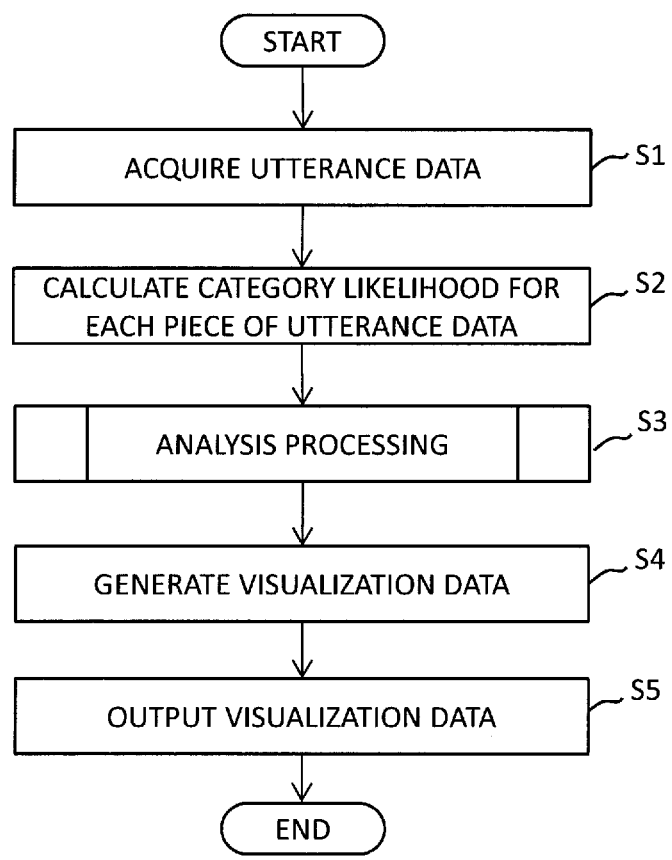
FIG. 9 is a flowchart illustrating utterance analysis processing to be executed by the utterance analysis device of FIG. 2.
Figure 10:
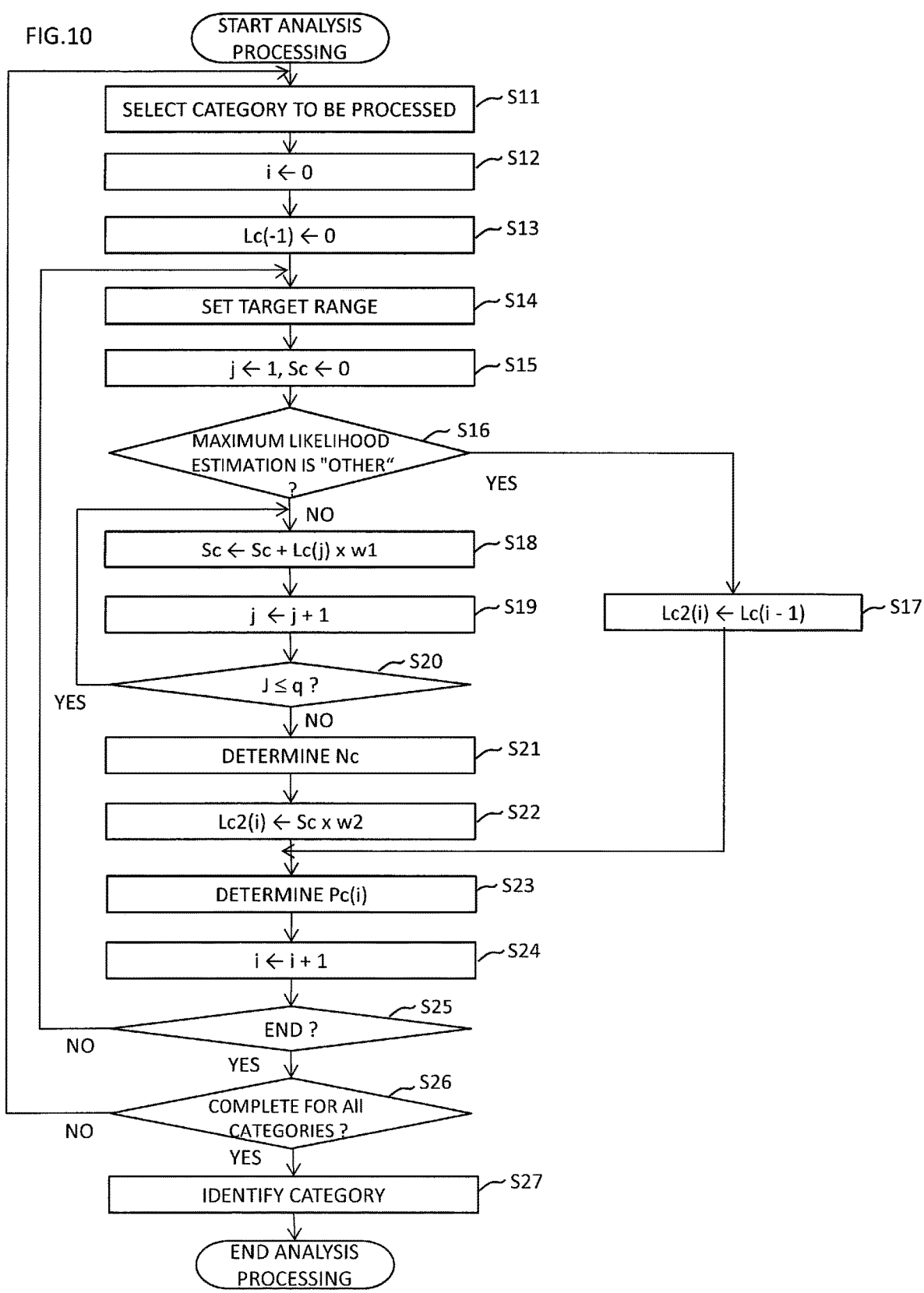
FIG. 10 is a flowchart illustrating the analysis processing of FIG. 9.

Utterance analysis processing of the utterance data in the utterance analysis device 1 is now described with reference to the flowcharts illustrated in FIG. 9 and FIG. 10. As illustrated in FIG. 9, in the utterance analysis device 1, for example, at the timing at which the utterer 20 makes an utterance, the acquirer 111 acquires the utterance data via the microphone, which is the input device 13, and stores the acquired utterance data together with a time-series assigned number in the storage 12 as the utterance data 121 (Step S1).

Further, the calculator 112 calculates the category likelihood for each category for each piece of utterance data 121 stored in Step S1, and stores the calculated category likelihoods in the storage 12 in association with the utterance data 121 (Step S2).

Then, the calculator 112 uses each likelihood calculated in Step S2 to execute analysis processing of analyzing the topic category by using the category likelihood included in each piece of utterance data 121 (Step S3).

The specific processing flow in the analysis processing of Step S3 is now described with reference to the flowchart illustrated in FIG. 10. As illustrated in FIG. 10, in the analysis processing, the calculator 112 selects the category to be processed (Step S11). For example, each of the categories of "XYZ Home," "room layout," "finance," and "other" is selected in order, and the following processing is repeated for each category.

First, for the category selected in Step S11, the calculator 112 initializes the value of "i" to 0 in order to identify the target range for which the integrated likelihood is to be calculated (Step S12). Here, "i" is a value for specifying the number to be assigned to the utterance data 121, and by initializing "i", the target range is set in order from the 0th piece of the utterance data 121 for the selected category. In the following, the number of pieces of utterance data 121 included in the target range is defined as "q".

Further, the calculator 112 sets the value of Lc(−1) to 0 (Step S13). Lc(i) is the likelihood determined from the i-th piece of the utterance data 121 for the category selected in Step S11. The "−1th" piece of the utterance data 121 does not exist, and therefore Lc(−1) also does not exist. However, Lc(i) may be used in the processing of Step S17, and therefore is set to "0" here.

Next, the calculator 112 sets the target range for calculating the integrated likelihood in accordance with the value of "i" (Step S14). At this time, the calculator 112 sets a new number "j" from "1" in the target range in order from the utterance data 121 of the number "i". As described above with reference to FIG. 4, in the example in which the 50 pieces of utterance data 121 is set as the time window T2, "j" uses a number of from 1 to 50. In this case, the number "q" of the target range is "50".

Specifically, in the above-mentioned example in FIG. 4, when "i" is "0", the integrated likelihood is calculated by setting the 0th piece of the utterance data 121 as the predetermined time "t", and therefore the calculator 112 sets the 0th piece of the utterance data 121 as the target range. In this case, regarding "j", "j" is "1" for the utterance data 121 in which "i" is "0". Further, the number "q" of the target range is "1".

Further, as described above with reference to FIG. 4, when "i" is "89", the calculator 112 sets the utterance data 121 from numbers 40 to 89 as the target range. In this case, "j" is set such that "j" is "1" when "i" is "40", and "j" is "50" when "i" is "89".

Further, as described above with reference to FIG. 7, in a case in which the period t1 is less than the time window T2 (when t1<T2), when "i" is "39", the integrated likelihood is calculated by setting the 39th piece of the utterance data 121 as the predetermined time "t", and therefore the calculator 112 sets the utterance data 121 from numbers 0 to 39 as the target range. In this case as well, regarding "j", "j" is "1" when "i" is "0". Further, the number "q" of the target range is "40".

After that, in order to calculate the integrated likelihood for the target range set in Step S14, the calculator 112 initializes the value of "j" to 1, and initializes a value of a temporary integrated likelihood Sc to 0 (Step S15). As described above, "j" is a value for specifying the utterance data 121 in the target range. Through the initialization of "j", the likelihood Lc(j) of each piece of utterance data 121 included in the target range can be added to obtain the integrated likelihood Lc2($i$). Further, the temporary integrated likelihood Sc is a value used in the calculation process for determining the integrated likelihood Lc2($i$) in the target range.

Next, the calculator 112 determines whether or not the category determined by maximum likelihood estimation is "other" from the category likelihood Lc of each piece of utterance data 121 of the target range set in Step S14 (Step S16). Specifically, the calculator 112 determines whether or not the category having the highest value among the category likelihoods of each category of the target range is "other."

When the category determined by the maximum likelihood estimation is "other" (YES in Step S16), the calculator 112 uses, for the selected category, an integrated likelihood Lc2($i$-1) of the target range managed by the utterance data 121 of the number "i-1" as the integrated likelihood Lc2($i$) of the target range managed by the utterance data 121 of the number "i" (Step S17). When "i" is "0", the "0" set for L(-1) in Step S13 is used.

Meanwhile, when the category determined by the maximum likelihood estimation is not "other" (NO in Step S16), the calculator 112 adds the value (Lc(j)×w1) obtained by weighting the category likelihood Lc(j) of the utterance data 121 of the number "j" by the freshness weighting value w1 to the temporary integrated likelihood Sc, and sets the obtained value as a new temporary integrated likelihood Sc (Step S18). For example, the freshness weighting value w1 may be calculated by "j/q".

When the new temporary integrated likelihood Sc is determined, the calculator 112 increments the value of "j" (Step S19). Then, the calculator 112 determines whether or not "j≤q" is satisfied (Step S20).

When "j≤q" is satisfied (YES in Step S20), this means that the processing has not been completed for all the utterance data 121 included in the target range, and therefore the process returns to the processing of Step S18, and the calculator 112 repeats the processing of Step S18 to Step S20.

Meanwhile, when "j≤q" is not satisfied (NO in Step S20), this means that the processing is complete for all utterance data 121 included in the target range, and therefore the calculator 112 determines a maximum likelihood topic category frequency Nc of the target category in the target range (Step S21). The maximum likelihood topic category frequency Nc is the number of times that the likelihood of the category selected as the processing target in Step S11 became the highest value in each piece of utterance data 121 of the target range. For example, in a case in which processing is being performed regarding "room layout," when the number of utterance data 121 having the highest category likelihood Lc (j) in the target range is "20", the maximum likelihood topic category frequency Nc is "20".

Then, the calculator 112 sets a value (Sc×w2) obtained by weighting the temporary integrated likelihood Sc by the frequency weighting value w2 as the integrated likelihood Lc2($i$) of the target range (Step S22). For example, the frequency weighting value w2 may be calculated by "Nc/q".

When the integrated likelihood L2c($i$) is determined, the calculator 112 determines a probability Pc(i) of the selected category for the target range by normalization (Step S23).

When the probability Pc (i) is obtained, the calculator 112 increments the value of "i" (Step S24). As a result, the value of "i" is set to a value for specifying the next target range.

Next, the calculator 112 determines whether or not an end timing has been reached (Step S25). The end timing is a case in which the processing has been performed for the whole range. For example, in the example of the category likelihoods shown in FIG. 4, for a series of pieces of utterance data 121, the end timing is a case in which the processing for the utterance data 121 having the last number "276" in the time series has ended.

When the end timing has not been reached (NO in Step S25), this means that the processing has not been completed for all the utterance data 121 in the utterance period T1, and therefore the process returns to the processing of Step S14, and the calculator 112 repeats the processing of Step S14 to Step S25.

Meanwhile, when the end timing has been reached (YES in Step S25), this means that the processing is complete for all the utterance data 121 in the utterance period T1, and therefore it is determined whether or not the processing of Step S12 to Step S25 is complete for all categories (Step S26).

When the processing has not been completed for all categories (NO in Step S26), the process returns to Step S11. Then, the calculator 112 selects another category, and repeats the processing of Step S11 to Step S25 until all categories are complete. For example, when the "XYZ Home" category is complete, the same processing is repeated by selecting "room layout," then "finance," and lastly "other."

When the processing of Step S11 to Step S25 is complete for all categories (YES in Step S26), for all the target ranges set in Step S14, the calculator 112 identifies the topic category based on a maximum likelihood estimation by using the integrated likelihood Lc2($i$) (Step S27). Further, when the categories are identified (Step S27), the calculator 112 can calculate the integrated likelihood Lc2 and the probability Pc(i) of each category, and thus ends the analysis processing (Step S3 of FIG. 9).

As illustrated in FIG. 9, the generator 113 generates visualization data for each category in the processing of Step S3 (Step S4).

Further, the display processor 114 outputs the visualization data generated in Step S4 to the output device 14, for example, a display (Step S5).

[1-3. Effect and Others]

In the utterance analysis device 1, the utterances of the utterer 20 can be visualized in this way. As a result, evaluation of the utterances of the utterer 20 can be easily implemented. Further, a separate utterer can easily refer to the utterances of the utterer 20, who is another person.

As described above, the embodiment described above has been described as an example of the technology disclosed in the present application. However, the technology of the present disclosure is not limited to this, and can also be applied to embodiments in which modifications, replacements, additions, and omissions, for example, have been made as appropriate.

Other Embodiments

In the embodiment described above, there is described an example in which the acquirer 111 acquires the utterance data at the timing at which the utterer 20 makes an utterance, but the present disclosure is not limited to this. For example, the acquirer 111 may acquire and use at a later timing utterance data recorded at the timing of the utterance of the utterer 20 from an external recording device which records voice data, for example, an IC recorder. Further, the acquirer 111 may acquire and use an uttered statement input as a text sentence like a chat.

In the embodiment described above, there is described an example in which the calculator 112 included in the utterance analysis device 1 calculate the "category likelihood," but the present disclosure is not limited to this. Specifically, the utterance analysis device 1 may acquire and use a category likelihood calculated by an external calculation device.

The utterance analysis device 1 may include a receiver receives a period specified by the user 22. In this case, for example, the calculator 112 can serve as the reception unit to receive a period via the input device 13 or the communication unit 15, and calculate the integrated likelihood by using the period specified by the user 22 as the time window T2. Specifically, the utterer 20 or the user 22, who is a third party analyzing the utterances of the utterer 20, may freely set the time window T2 in accordance with the target utterance. When a topic of a certain category continues for a long time in the utterances, depending on the length of the period set as time window T2, it can become difficult to detect a change in the topic. Therefore, by setting an appropriate time window T2 in this way, it is possible to improve the detection accuracy of a change in the topic.

Figure 11:
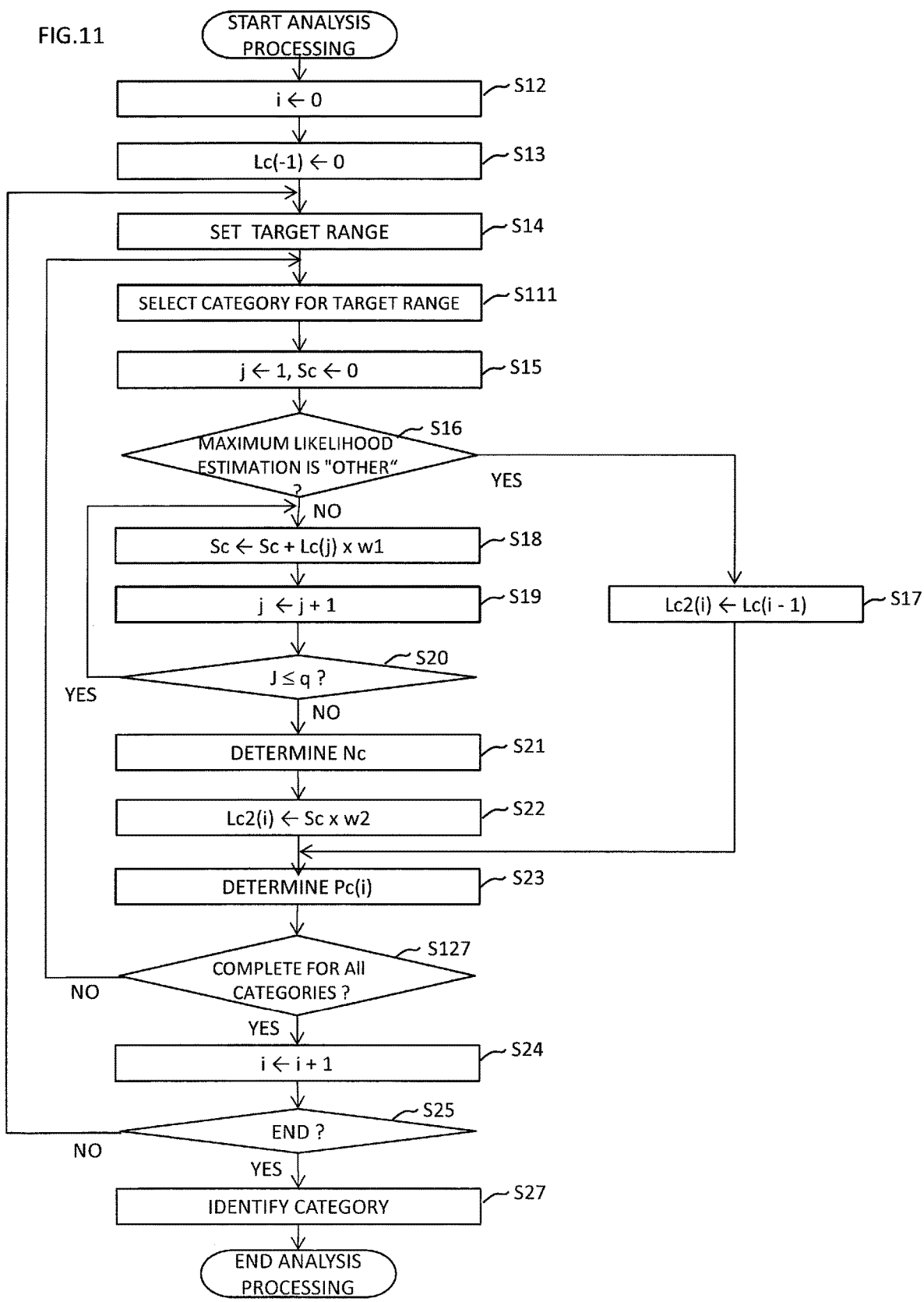
FIG. 11 is a flowchart illustrating another example of the analysis processing of FIG. 9.

In the embodiment described above, as illustrated in FIG. 10, there is described a method in which first the target category is selected in Step S11, then the target range is set in Step S14 for each selected category, and the integrated likelihood of each target range set in order is determined, but the present disclosure is not limited to this. Specifically, it is sufficient that, as a result of the processing, the integrated likelihood of all categories can be obtained for each range. For example, as illustrated in FIG. 11, there may be used a method in which the target range is first set in Step S14, then the categories are selected in order in Step S111 in the set target range, and the integrated likelihood of each category is determined. In this case, as illustrated in FIG. 11, when Pc(i) is determined in Step S23, the calculator 112 determines whether or not the processing of Step S15 to Step S23 is complete for all categories (Step S127).

Figure 12:
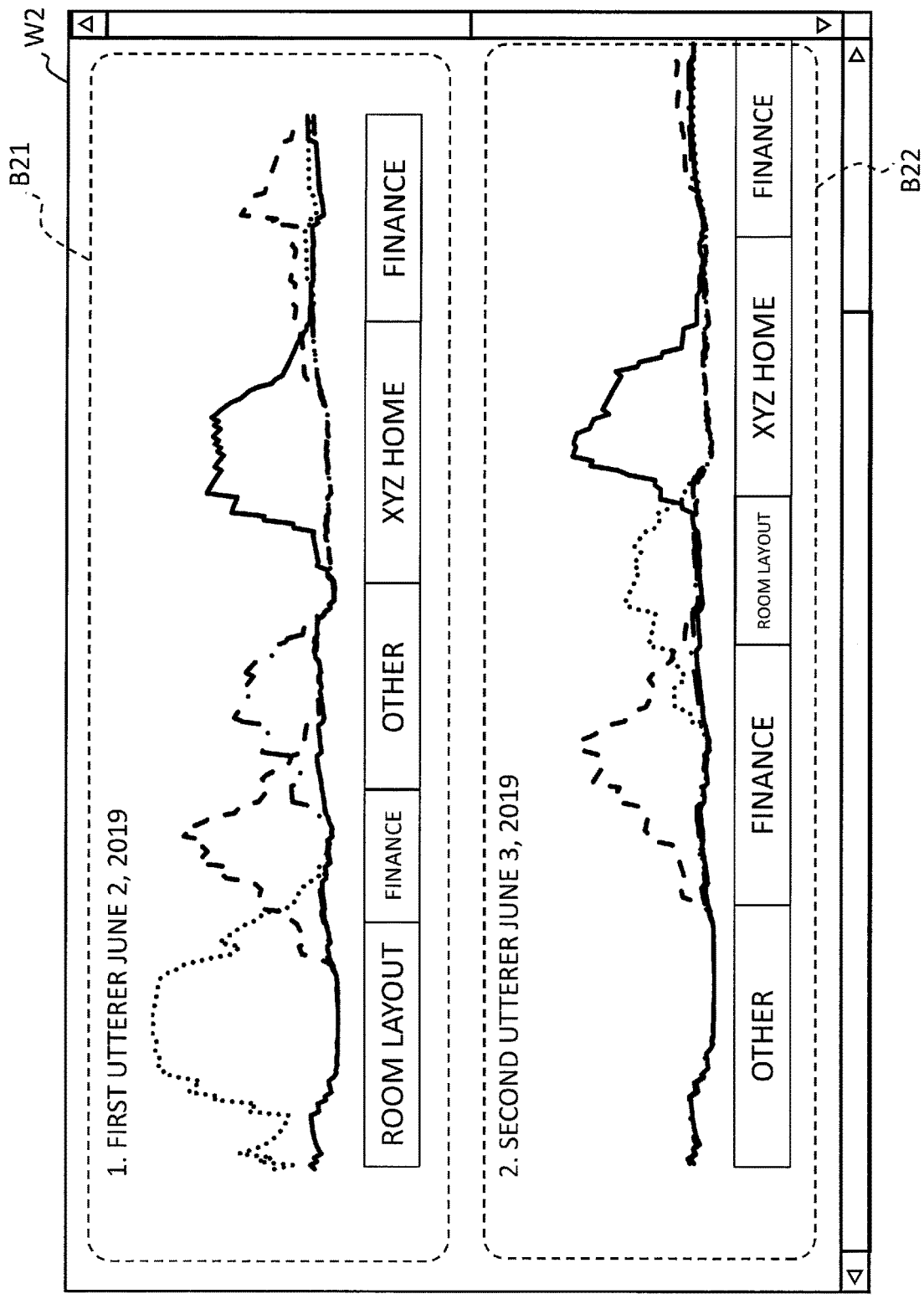
FIG. 12 is another example of a screen displayed as visualization data by the utterance analysis device of FIG. 2.
Figure 13:
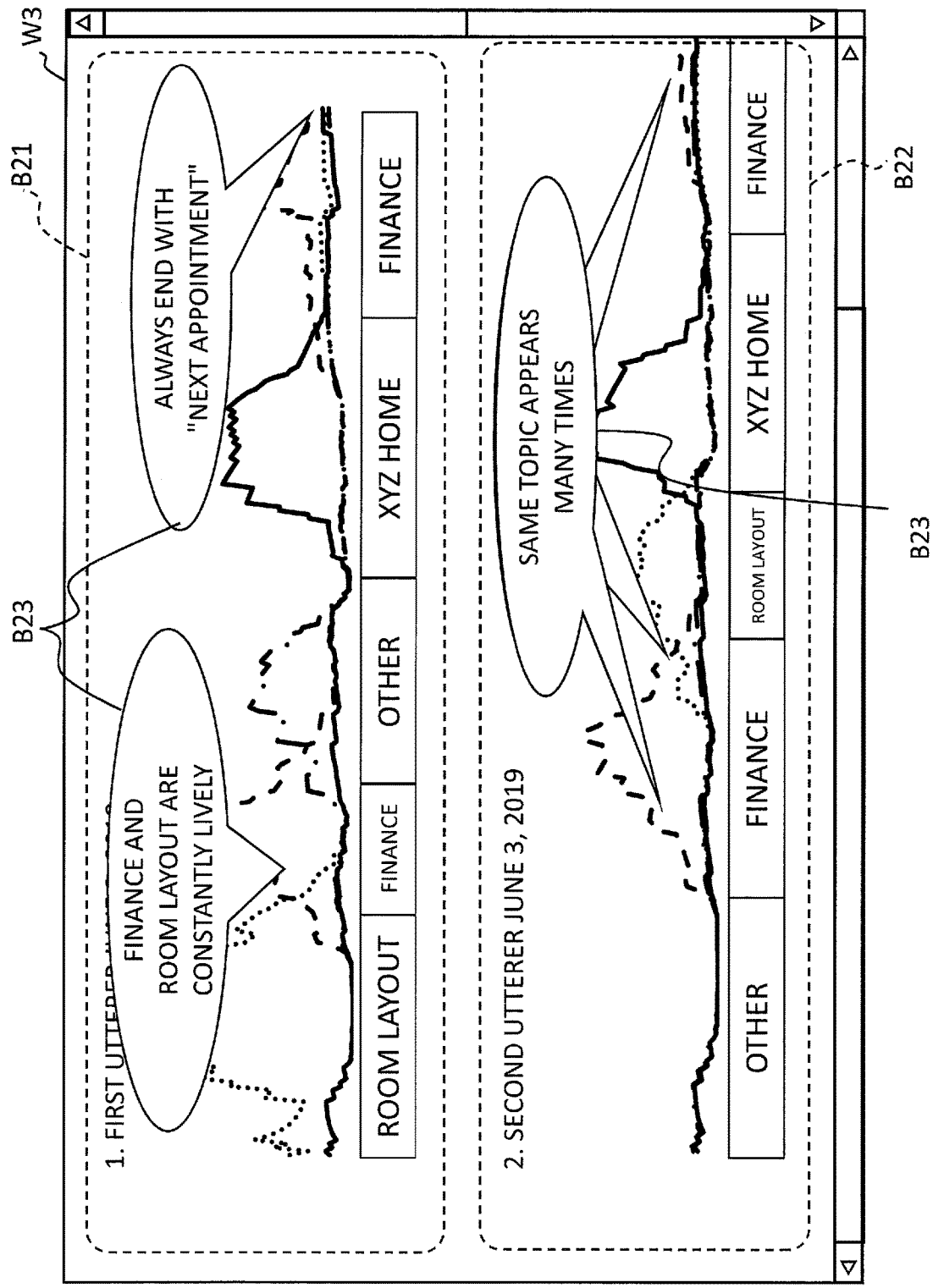
FIG. 13 is another example of a screen displayed as visualization data by the utterance analysis device of FIG. 2.

The generator 113 may use the utterance data 121 of a plurality of utterers 20 stored in the storage 12 to generate comparison data comparing visualization data generated from the utterance data 121 of a first utterer 20 and visualization data generated from the utterance data 121 of a second utterer different from the first utterer 20. FIG. 12 is an example of a display screen W2 including a display section B21 for displaying visualization data of the utterance data 121 of the first utterer 20 and a display section B22 for displaying visualization data of the utterance data 121 of the second utterer. As illustrated in FIG. 12, the visualization data for two people is displayed on the display screen W2 in a comparable manner, and therefore the user 22 can compare the topic of each utterer at a glance without confirming the utterance data of two people for a long period of time by voice or by scripted data. For example, through the display of the visualization data of two people in parallel, the user 22 can easily compare what kind of explanation method, specifically, what speaking flow, is effective. At this time, as illustrated in FIG. 13, the generator 113 may also generate visualization data for displaying a display screen W3 including a display section B23 for displaying analysis results.

Figure 14:
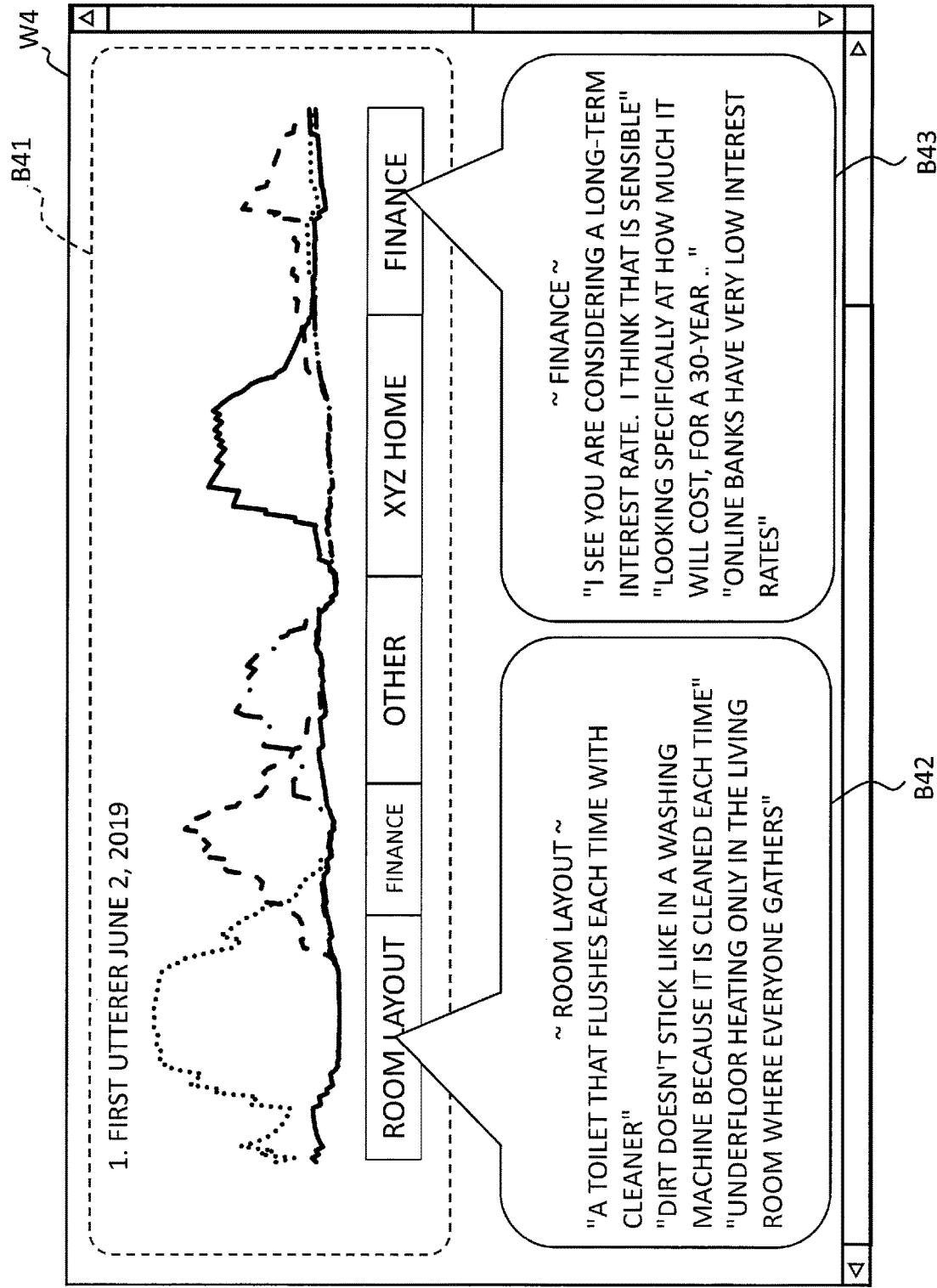
FIG. 14 is another example of a screen displayed as visualization data by the utterance analysis device of FIG. 2.

The generator 113 may generate visualization data including text of predetermined phrases, for example, among the pieces of utterance data. In FIG. 14, there is illustrated an example of a display screen W4 including a display section B41 displaying a graph for showing the change in the integrated likelihood obtained from the utterance data 121 of the utterer, a display section B42 displaying phrases extracted from the category topic "room layout," and a display section B43 in which phrases extracted from the "finance" category topic are displayed. For example, the text data of the phrases included in the display section B42 and the display section B43 is generated by comparing with other utterance data in the relevant category and extracting the utterance data having a high likelihood or utterance data having a higher likelihood than a predetermined value, or sentences including a specific word, from the voice data or data obtained by converting the voice data into text. As illustrated in FIG. 14, a plurality of phrases are displayed on the display screen, and therefore the user 22 can, for example, refer to the visualization data of the other utterer 20, who is another person, and think about a phrase to use in the future based on the phrases used by the utter 20. For example, by imitating the phrases of the utterer 20, who is another person, the user 22 can explain to the customer 21 in an easy-to-understand manner a matter that the user 22 did not know how to explain.

Figure 15:
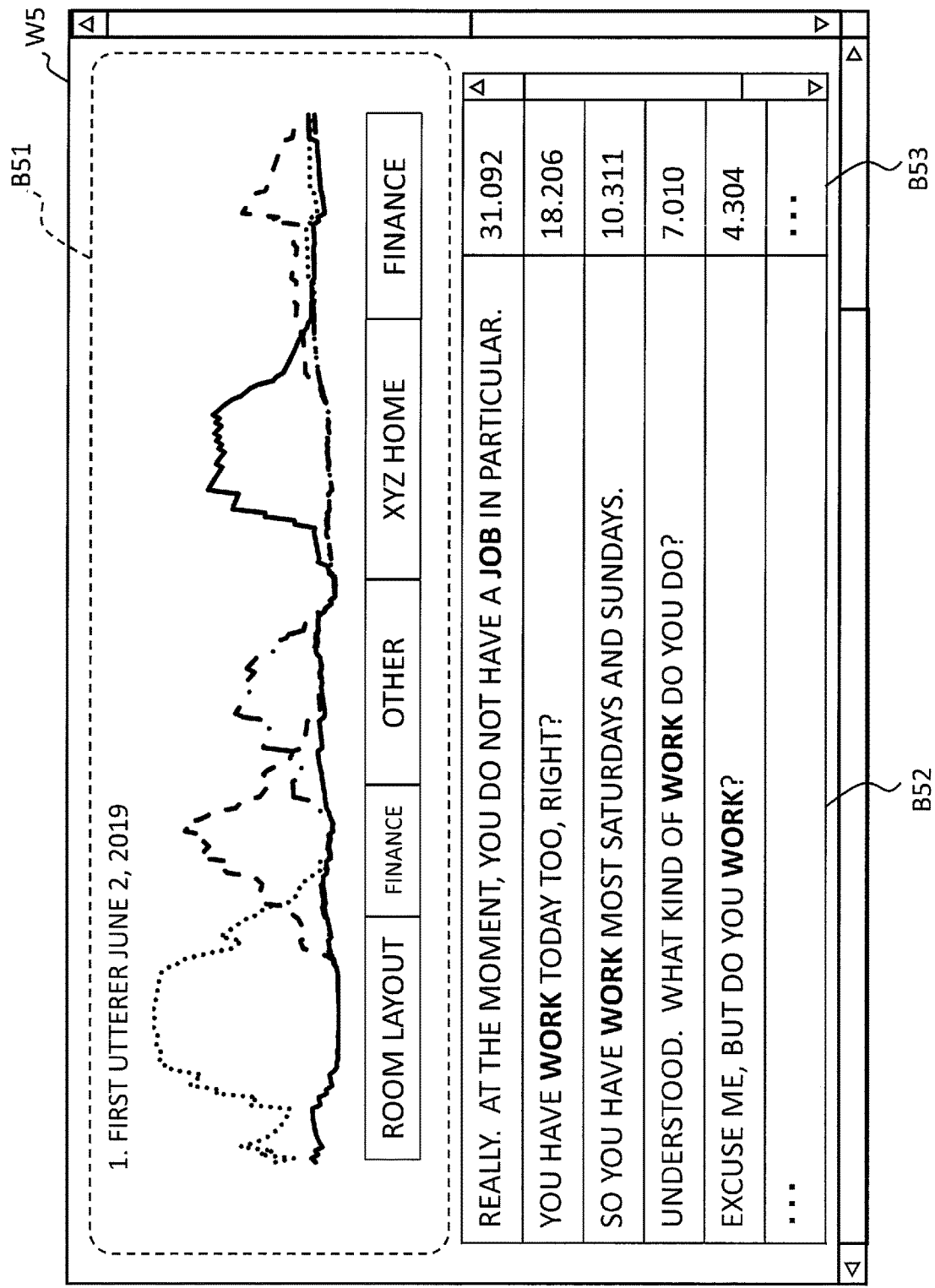
FIG. 15 is another example of a screen displayed as visualization data by the utterance analysis device of FIG. 2.

The generator 113 may arrange data obtained by converting the utterance data 121 into text in descending order of likelihood obtained from the utterance data 121, and generate visualization data including a predetermined number (for example, 10) of pieces from among the data having a high likelihood. In FIG. 15, there is illustrated an example of the display screen W5 including a display section B51 displaying a graph for showing the change in integrated likelihood obtained from the utterance data 121 of the utterer 20, a display section B52 displaying the text of the utterance data 121 in descending order of likelihood for a certain category, and a display section B53 displaying the likelihood of each text. The text displayed in the display section B52 and the likelihood displayed in the display section B53 are changed by switching the selection of the category which the user desires to display. Therefore, the user can confirm the utterance data 121 having a high likelihood for a desired category. Here, the generator 113 may generate visualization data which is displayed in an emphasized manner by changing the font, character size, and color, for example, of a word set as a keyword in advance from that of other characters. As a result, the user 22 can explain to a customer in an easy-to-understand manner by imitating the phrases of the utterer 20, who is another person.

Summary of Embodiments (1) An utterance analysis device of the present disclosure is an utterance analysis device for visualizing a change in utterances of an utterer in a first period, the utterance analysis device including; a calculator that receives a plurality of pieces of utterance data in order of time series and analyzes a change in the utterances by using a plurality of first likelihoods, which are each values for identifying a possibility that the utterance data corresponds to each category; and a display processor that displays visualization data visualizing the change in the utterances which is obtained by the calculator. In the utterance analysis device, the calculator determines a second likelihood for each category by integrating the first likelihoods of a plurality of pieces of utterance data in a second period which is shorter than the first period, and the visualization data displayed by the display processor represents a change in the utterances based on a change in the second likelihood of each category in a plurality of different second periods.

As a result, the course of the topic of the utterances of the utterer can be visualized. Therefore, the user can use the visualized information to evaluate the utterances of the utterer, and use the utterances of the utterer as a reference for future utterances by the user.

(2) The calculator of Item (1) may be: identify a category at a predetermined time based on the second likelihood of each category determined by integrating the first likelihoods of the plurality of pieces of utterance data acquired in the second period immediately before the predetermined time; and identify respective categories at a plurality of predetermined times which are continuously obtained in the time series, and the visualization data displayed by the display processor may be data visualizing, as a change in topic, a change among the categories at the plurality of predetermined times in the time series.

As a result, in place of short-term utterance data, the utterance data of a predetermined period before the short-term utterance data can be taken into consideration, and the course of the topic can be represented as a gradual change.

(3) The calculator of Item (1) or (2) may be: determine the second likelihood for each category by integrating the first likelihoods obtained from the utterance data included in the second period; and identify, of the obtained second likelihoods of the respective categories, a category having the largest value as a topic category of the second period.

As a result, in place of short-term utterance data, the utterance data of a predetermined period before the short-term utterance data can be taken into consideration, and the course of the topic can be represented as a gradual change.

(4) The calculator of Item (3) may be determine the second likelihood by using a first weighting value which is set to a larger value as a frequency of appearing in the second period becomes higher.

As a result, the category can be identified in consideration of the frequency within a predetermined period. Thus, the change in the category likelihood of a series of utterance data can be considered, and an appropriate change can be represented.

(5) The calculator of Item (3) or (4) may be determine the second likelihood by using a second weighting value which is set to a larger value as the utterance data becomes closer to the predetermined time.

As a result, the category can be identified in consideration of the freshness within a predetermined period. Thus, the change in the category likelihood of a series of utterance data can be considered, and an appropriate change can be represented.

(6) The utterance analysis device of Items (2) to (5) may be calculate, when a period from a start of the first period to the predetermined time is less than the second period, the second likelihood by using the utterance data of the period from the start of the first period to the predetermined time.

As a result, regarding the identification of the topic of a predetermined period from the start of the utterances, even when the utterance data is insufficient, the utterance data for a certain length of period can be used, and an appropriate change can be represented.

(7) The utterance analysis device of Items (1) to (6) may further include a reception unit receives a period specified by a user, and the calculator may be determine the second likelihood by using the period received by the reception unit as the second period.

As a result, the user can set the second period, and therefore the most appropriate information can be provided to the user.

(8) The visualization data displayed by the display processor of Items (1) to (7) may include a graph in which the second likelihood of each category is represented in time series.

As a result, the transition of the topic is displayed in an easy-to-understand manner, and the user can easily grasp the transition of the topic.

(9) The visualization data displayed by the display processor of Items (1) to (7) may include text data of the utterances included in the utterance data.

As a result, the user can grasp the topic of the utterance as well as the transition of the topic.

(10) The visualization data displayed by the display processor of Items (1) to (7) may be comparison data comparing the visualization data generated from the utterance data of a first utterer and the visualization data generated from the utterance data of a second utterer.

As a result, the user can more easily compare the topic of the utterances of a plurality of utterers.

(11) The calculator of Items (1) to (10) may be calculate the first likelihood relating to each category for each piece of utterance data.

As a result, a first likelihood can be calculated in the utterance analysis device, and therefore processing can be performed independently of the network load.

(12) A utterance analysis method of the present disclosure is an utterance analysis method for visualizing a change in utterances of an utterer in a first period, the utterance analysis method comprising: receiving, from an input device, utterance data of the utterer in order of time series; analyzing, by a calculator, a change in the utterances by using a plurality of first likelihoods, which are each values for identifying a possibility that the acquired utterance data corresponds to each category; and displaying, by a display processor, visualization data visualizing the obtained change in the utterances; integrating, by the calculator determines a second likelihood for each category by integrating the first likelihoods of a plurality of pieces of utterance data in a second period which is shorter than the first period, the visualization data displayed by the display processor representing a change in the utterances based on a change in the second likelihood of each category in a plurality of different second periods.

As a result, the course of the topic of the utterances of the utterer can be visualized. Therefore, the user can use the visualized information to evaluate the utterances of the utterer, and use the utterances of the utterer as a reference for future utterances by the user.

(13) A non-transitory computer-readable recording medium storing a computer program causing a control circuit include in a computer to implement the method of Item (12).

As a result, the course of the topic of the utterances of the utterer can be visualized. Therefore, the user can use the visualized information to evaluate the utterances of the utterer, and use the utterances of the utterer as a reference for future utterances by the user.

The utterance analysis device, the utterance analysis method, and the computer program described in all the claims of the present disclosure are implemented through, for example, operation of hardware resources, for example, a processor and a memory, in cooperation with a computer program.

INDUSTRIAL APPLICABILITY

The utterance analysis device, the utterance analysis method, and the computer program of the present disclosure are useful when, for example, utterances by an utterer, for example, a person engaged in sales by talking, a teacher giving a type of lesson, or a respondent answering questions at a call center, are evaluated when utterances are made for a certain period, or when another person uses the topic of those utterances for reference.

What is claimed is:

1. An utterance analysis device for visualizing a change in utterances of an utterer in a first period, the utterance analysis device comprising;
   a calculator that receives a plurality of pieces of utterance data in order of time series and analyzes a change in the utterances by using a plurality of first likelihoods, which are each values for identifying a possibility that each of the plurality of pieces of utterance data corresponds to each category of a plurality of categories; and
   a display processor that displays visualization data visualizing the change in the utterances which is obtained by the calculator,
   wherein the calculator integrates the first likelihoods of the plurality of pieces of utterance data in a second period which is immediately before a predetermined time included in the first period and which is shorter than the first period to determine a second likelihood at the predetermined time for each category, and identifies, of the obtained second likelihoods of the respective categories, a category having the largest value as a topic category at the predetermined time, wherein
   the calculator identifies respective categories at a plurality of predetermined times which are continuously obtained in the time series, and
   the display processor displays multiple time sequences each including changes of the values of the second likelihood for each category in the plurality of categories in the time series as the visualization data representing a change in the utterances.

2. The utterance analysis device according to claim 1, wherein the calculator determines the second likelihood by using a first weighting value which is set to a larger value as a frequency of appearing in the second period becomes higher.

3. The utterance analysis device according to claim 1, wherein the calculator determines the second likelihood by using a second weighting value which is set to a larger value as the utterance data becomes closer to the predetermined time.

4. The utterance analysis device according to claim 1, wherein the calculator calculates, when a period from a start of the first period to the predetermined time is less than the second period, the second likelihood by using the utterance data of the period from the start of the first period to the predetermined time.

5. The utterance analysis device according to claim 1, further comprising a receiver receives a period specified by a user,
   wherein the calculator determines the second likelihood by using the period received by the reception unit as the second period.

6. The utterance analysis device according to claim 1, wherein the visualization data displayed by the display processor includes a graph in which the second likelihood of each category of the plurality of categories is represented in time series.

7. The utterance analysis device according to claim 1, wherein the visualization data displayed by the display processor includes text data of the utterances included in the utterance data.

8. The utterance analysis device according to claim 1, wherein the visualization data displayed by the display processor is comparison data comparing a visualization data generated from the utterance data of a first utterer and a visualization data generated from the utterance data of a second utterer.

9. The utterance analysis device according to claim 1, wherein the calculator calculates the first likelihood relating to each category for each piece of utterance data.

10. The utterance analysis device according to claim 1, wherein the calculator identifies, at each predetermined time determined for each piece of utterance data, each category at the plurality of predetermined times by identifying a topic category at the predetermined time based on the second likelihood obtained by integrating the first likelihoods for only the second period immediately before the predetermined time.

11. The utterance analysis device according to claim 1, wherein the second period is longer than a time interval between two predetermined times adjacent to each other in the plurality of predetermined times.

12. An utterance analysis method for visualizing a change in utterances of an utterer in a first period, the utterance analysis method comprising:
   receiving, from an input device, a plurality of pieces of utterance data of the utterer in order of time series;
   analyzing, by a calculator, a change in the utterances by using a plurality of first likelihoods, which are each values for identifying a possibility that each of the acquired plurality of pieces of utterance data corresponds to each category of a plurality of categories;
   displaying, by a display processor, visualization data visualizing the obtained change in the utterances;
   integrating, by the calculator, the first likelihoods of the plurality of pieces of utterance data in a second period which is immediately before a predetermined time included in the first period and which is shorter than the first period to determine a second likelihood at the predetermined time for each category; and identifying, by the calculator, of the obtained second likelihoods of the respective categories, a category having the largest value as a topic category at the predetermined time, wherein the identifying, by the calculator, identifies respective categories at a plurality of predetermined times which are continuously obtained in the time series, and displaying the visualization data, by the display processor, changes of the values of the second likelihood for each category in the plurality of categories in the time series as the visualization data representing a change in the utterances.

13. A non-transitory computer-readable recording medium storing a computer program causing a control circuit include in a computer to implement the utterance analysis method of claim 12.

14. The utterance analysis device according to claim 1, wherein the display processor further displays, as the visualization data, the topic category identified at the predetermined time by the calculator, concurrently with the changes of the values of the second likelihood for each category in the plurality of categories in the time series as the visualization data.

15. The utterance analysis device according to claim 1, wherein the visualization data indicates concurrent changes of the values of the second likelihoods over the plurality of categories in the time series.

16. The utterance analysis device according to claim 1, wherein the display processor parallelly displays multiple graphs as the multiple time sequences for the plurality of categories, the multiple graphs each including sequential values of the second likelihood of a corresponding category among the plurality of categories in the time series.

* * * * *